(No Model.)

F. J. B. CORDEIRO.
TELEMETER.

No. 565,841. Patented Aug. 11, 1896.

WITNESSES:
L. N. Legendre
C. R. Ferguson

INVENTOR
F. J. B. Cordeiro.
BY
ATTORNEYS.

UNITED STATES PATENT OFFICE.

FREDERICK JOAQUIN BARBOSA CORDEIRO, OF THE UNITED STATES NAVY.

TELEMETER.

SPECIFICATION forming part of Letters Patent No. 565,841, dated August 11, 1896.

Application filed April 4, 1896. Serial No. 586,193. (No model.)

*To all whom it may concern:*

Be it known that I, FREDERICK JOAQUIN BARBOSA CORDEIRO, of the United States Navy, have invented certain new and useful Improvements in Telemeters, of which the following is a full, clear, and exact description.

This invention relates to telemeters or optical instruments for measuring distances, and the object is to provide an instrument of this character in which there are very few parts compactly arranged, and with which a single observation, by a single observer, will ascertain the distance, and in which the manipulation of the instrument may be easily acquired.

I will describe an instrument embodying my invention, and then point out the novel features in the appended claims.

Reference is to be had to the accompanying drawings, forming a part of this specification, in which similar characters of reference indicate corresponding parts in both the figures.

Figure 1:
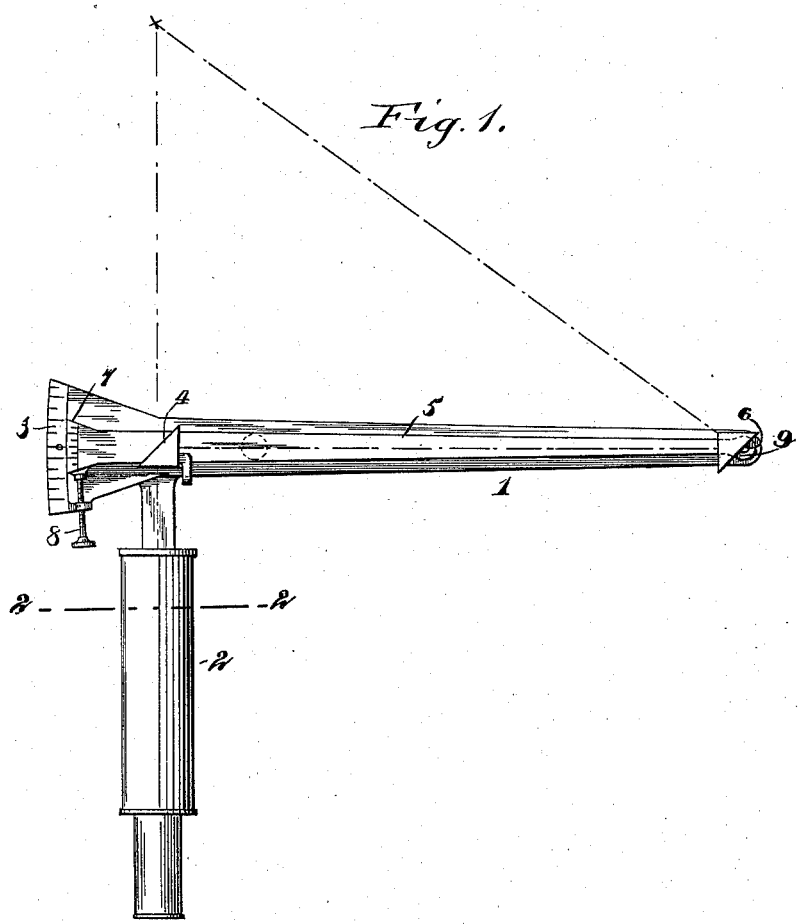
Figure 2:
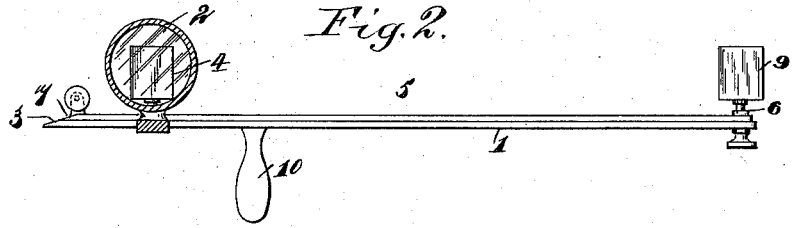

Figure 1 is a plan view of an instrument embodying my invention, and Fig. 2 is a side elevation thereof.

The telemeter comprises an arm 1, supported by and extended at right angles to a vision-instrument or telescope 2. This arm may conveniently be about three feet long, so that the instrument may be easily handled by one observer. The end of the arm 1, adjacent the telescope 2, is provided with a graduation-scale 3 for either angles or distances. Rigidly mounted on the arm 1, and coincident with the lower half of the field of the telescope 2, is a horizon-glass 4, which is here shown as a totally-reflecting right-angle prism, but I do not wish to confine my invention to said prism form, as it is obvious that other forms of reflectors may be employed—such, for instance, as half-silvered glass.

A lever 5 has one end pivoted to the outer end of the arm 1, as at 6, and the opposite end is provided with a vernier 7, coacting with the graduation 3. This vernier may be adjusted by means of a screw 8, extended through a tapped hole in a lug on the arm 1, and engaging at its end with the lever 5. Rigidly connected to the pivoted end of the lever 5, and having its reflecting-surface at an angle of forty-five degrees to the axis of the lever, is an index-glass 9, which is here shown as a right-angle prism, but other forms of index or reflecting surfaces may be employed, such as a mirror or burnished metal.

The arm 1 may be provided with a handle 10, placed in such position that the two ends of the instrument may be equally balanced therefrom.

In use the instrument is so placed that the line of collimation through the telescope and horizon-glass 4 will be in the direct line of the object the distance of which is to be measured, and then the lever 5 will be manipulated to cause the glass 9 to receive the image and reflect it to the horizon-glass at a point coincident with the line of collimation. The angle, by means of the vernier, may be known, and as the length of base-line is known, the distance of the object may be readily ascertained by computation or from prepared tables, or, better, the scale is marked empirically for distances, so that distances are read at once.

Having thus described my invention, I claim as new and desire to secure by Letters Patent—

1. A telemeter, comprising a telescope, an arm arranged at right angles thereto and having a scale at its end near the telescope, a right-angled prism supported on the arm in the line of vision of the telescope, a lever having pivotal connection with said arm at its end opposite that containing the scale, a vernier on said lever coacting with the scale, and an index-glass on said pivoted lever at its pivotal point, the said index-glass consisting of a right-angled prism and having one of its right-angled sides extended toward one of the right-angled sides of the first-named prism, substantially as specified.

2. A telemeter, comprising a telescope, an arm arranged at right angles thereto, the said arm serving as a base-line and also as a radius for measuring angles, a sight or horizon glass supported on said arm in the line of vision of the telescope, a lever having its end pivoted to the end of the arm, an index-glass mounted on said lever at its pivotal point, and a vernier on the opposite end of said lever coacting with a scale on the arm, substantially as specified.

FREDERICK JOAQUIN BARBOSA CORDEIRO.

Witnesses:
L. C. LOGAN,
G. G. MITCHELL.